June 19, 1956

J. W. BEGLEY
PEBBLE HEAT EXCHANGE CHAMBER 2,751,211

Filed July 25, 1952

INVENTOR.
J. W. BEGLEY
BY Hudson and Young
ATTORNEYS

June 19, 1956   J. W. BEGLEY   2,751,211
PEBBLE HEAT EXCHANGE CHAMBER
Filed July 25, 1952   2 Sheets-Sheet 2

INVENTOR.
J. W. BEGLEY
BY Hubbard and Young
ATTORNEYS

United States Patent Office 2,751,211
Patented June 19, 1956

2,751,211

PEBBLE HEAT EXCHANGE CHAMBER

John W. Begley, Bartlesville, Okla., assignor to Phillips Petroleum Company, a corporation of Delaware Application July 25, 1952, Serial No. 301,003

6 Claims. (Cl. 263—19)

This invention relates to pebble heater apparatus. In one of its more specific aspects, it relates to improved pebble heat exchange chambers of pebble heater apparatus. In another of its more specific aspects, it relates to a pebble heater chamber. In another of its more specific aspects, it relates to improved means for obviating pebble temperature differentials within pebble conduits from pebble heater chambers.

Apparatus of the so-called "pebble heater" type have been utilized in recent years for the purpose of heating fluid to elevated temperatures. Such apparatus is especially suited for use in temperature ranges above those at which the best available high temperature structural alloys fail. Thus, such equipment may be used for superheating steam or other gases and for the pyrolysis of hydrocarbons to produce volatile products such as ethylene and acetylene, as well as for other reactions and purposes. Conventional pebble heater type apparatus includes two refractory lined chambers disposed one above the other and connected by a refractory lined passageway or pebble throat of relatively narrow cross section.

Refractory solids of flowable size and form, called "pebbles," are passed continuously and contiguously through the system flowing by gravity through the uppermost chamber, the throat, and the lowermost chamber, and are then conveyed to the top of the uppermost chamber to complete the cycle.

Solid heat exchange material which is conventionally used in pebble heater apparatus is generally called "pebbles." The term "pebbles" as used herein denotes any solid refractory material of flowable size and form having strength which is suitable to carry large amounts of heat from the pebble heating chamber to the gas heating chamber without rapid deterioration or substantial breaking. Pebbles conventionally used in pebble heater apparatus are ordinarily substantially spherical in shape and range from about one eighth inch to about one inch in diameter. In a high temperature process, pebbles having a diameter of between one fourth inch to three eighths inch are preferred. The pebbles must be formed of refractory materials which will withstand temperatures of at least as high as the highest temperature obtained in the pebble heating chamber. The pebbles must also be capable of withstanding temperature changes within the apparatus. Refractory materials, such as metal alloys, ceramics, or other satisfactory materials may be utilized to form such pebbles. Silicon carbide, alumina, periclase, beryllia, stellite, zirconia, and mullite may be satisfactorily used to form such pebbles or may be used in admixture with each other or with other materials. Pebbles formed of such materials, when properly fired, serve very well in high temperatures, some withstanding temperatures up to about 4000° F. Pebbles which are used may be either inert or catalytic as used in any selected process.

The pebbles are heated in one of the chambers (preferably the upper one) by direct contact therein with hot gases, usually combustion products, to temperatures generally in the range of 1400° F. to 3200° F. The hot pebbles are thereafter contacted with the fluid to be superheated or reacted, as the case may be, in the other chambers. Generally, pebble inlet temperatures in the second chamber are about 100° F. to 200° F. below the highest temperature of the pebbles within the first chamber. In processes for the production of ethylene from light hydrocarbons, such as ethane or propane, the pebble temperature in the reaction chamber is usually in the range of 1200° F. to 1800° F. For the production of acetylene by pyrolysis of hydrocarbons, temperatures in the range of 1600° F. to 3000° F. are desirable.

One disadvantage of conventional pebble chambers is that gases tend to take a path of least resistance through the gravitating pebble mass and pebbles gravitating through that chamber tend to flow at dissimilar rates. Thus, pebbles and heating gas or gas being heated are subjected to different times of contact so as to obtain non-uniform heat exchange. The result of this type of operation is that pebbles which are heated in a pebble heater chamber are normally not of uniform temperature when gravitated from the lower end thereof. When these pebbles are introduced into a reaction chamber, the gaseous materials being treated in the reaction chamber are subjected to different temperatures, with the result that the conversion of the gaseous material is not uniform and the desired products are not obtained in the greatest possible amounts.

Each of the objects of this invention is attained by at least one of the aspects of the invention.

An object of this invention is to provide improved means for thermally treating or reacting gaseous materials. Another object of the invention is to provide improved means for obviating differences in pebble temperatures in pebble heater chambers. Another object of the invention is to provide an improved pebble heater chamber having an improved type soaking zone in the lower end thereof. Another object of the invention is to provide an improved method for obtaining more uniform cracking of hydrocarbon materials in a pebble reactor chamber. Other and further objects of the invention will be apparent upon study of the accompanying disclosure.

Broadly speaking, this invention comprises an improvement in pebble heater chambers in the provision of a load supporting dome which supports a secondary gas distribution dome in the central portion of the pebble heater chamber. The load supporting dome is provided with pebble conduits at its periphery. A gas distribution chamber is provided along the lower end portion of the pebble heater chamber and about the periphery thereof and is provided with conduits communicating between the gas distribution chamber and a soaking zone below the load supporting dome. These conduits extending between the gas distribution chamber and the soaking zone extend to a level below the normal level of a pebble bed formed within the soaking zone.

Better understanding of this invention will be apparent to those skilled in the art upon study of the diagrammatic drawings in which Figure 1 is a vertical section view of a pebble heater chamber embodying this invention.

Figure 1:
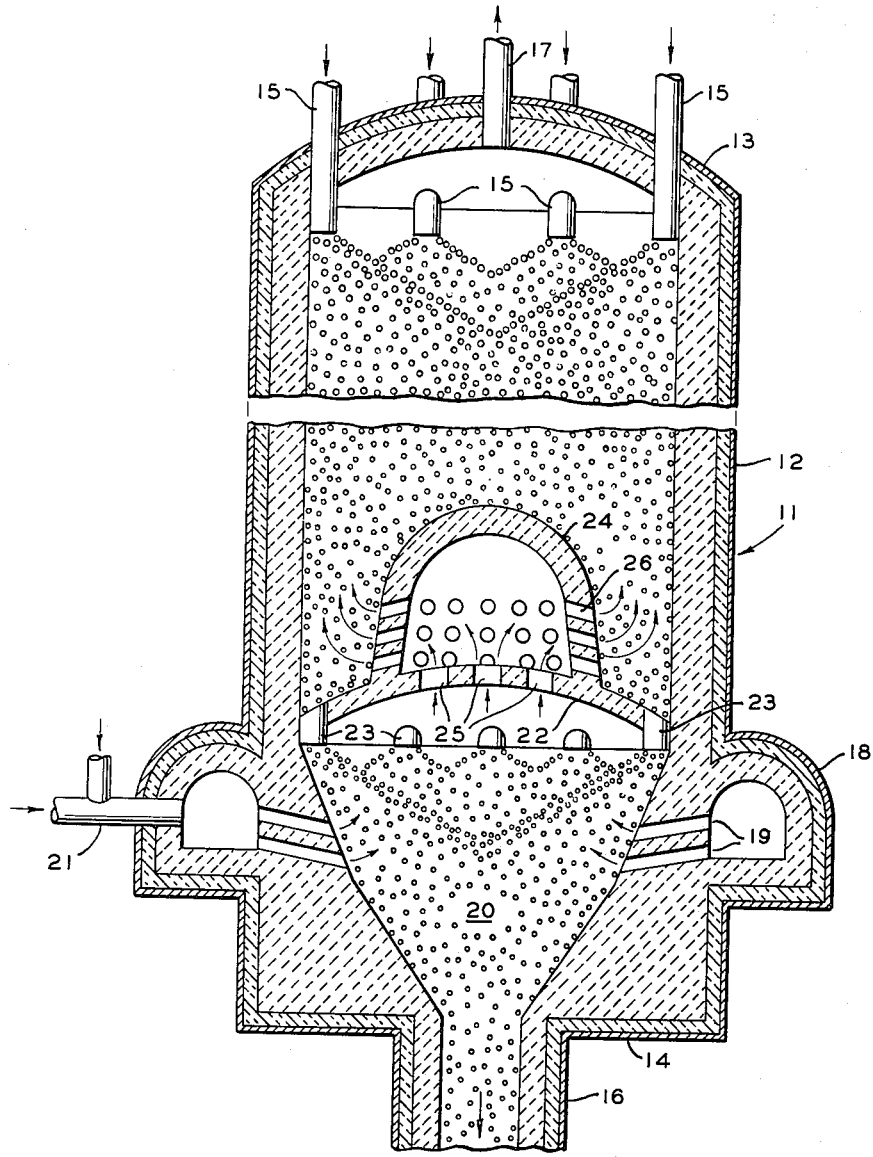

Referring particularly to the device shown in Figure 1 of the drawings, pebble heat exchange chamber 11 comprises upright, elongated shell 12 closed at its upper and lower ends by closure members 13 and 14, respectively. Pebble inlet conduits 15 are provided in the upper end portion of shell 12, preferably in closure member 13 adjacent the wall of shell 12. Pebble outlet conduit 16 is provided in the lower end of shell 12 in closure member 14. Gaseous effluent outlet conduit 17 is provided in the upper end portion of shell 12, preferably centrally disposed in closure member 13. Gas distribution chamber 18 is provided about the periphery of the shell 12 in its lower end portion. Gaseous material inlet conduits 19 extend from gas distribution chamber 18 into the lower end of the chamber formed within shell 12, hereafter called soaking zone 20. Gaseous material inlet conduit 21 extends into gas distribution chamber 18. If desired pebble conduits means connected to the upper end portion of shell 12 may be in the form of a single pebble inlet, such as is disclosed in connection with Figure 2 hereinbelow, and gaseous effluent conduit may be offset from the central portion of the chamber as also described in connection with Figure 2 of the drawings. A load supporting dome 22 is provided in the lower portion of the chamber formed within shell 12 and above the level of the inlet conduits 19. Pebble conduits 23 are provided through the periphery of load supporting dome 22 and provide pebble communication between the pebble heating zone above that dome and the pebble soaking zone below the dome. Centrally positioned within the chamber formed within shell 12, and supported upon load supporting dome 22, is a secondary gas distribution dome 24. This dome communicates with the gas distribution chamber 18 by means of conduits 19, soaking zone 20 and openings 25 through load supporting dome 22. The communication between soaking zone 20 and the interior of dome 24 may be by means of a plurality of openings 25 as shown, or may be by a single large opening provided through the central portion of load supporting dome 22 as discussed in connection with Figure 2. Gas distribution conduits 26 are provided in the side of dome 24 so as to permit the flow of gaseous materials from the interior of dome 24 only through the sides thereof. The top of dome 24 is preferably imperforate, although small perforations may be provided therein so as to permit the escape of a very small amount of heating material therethrough.

Figures 2, 3:
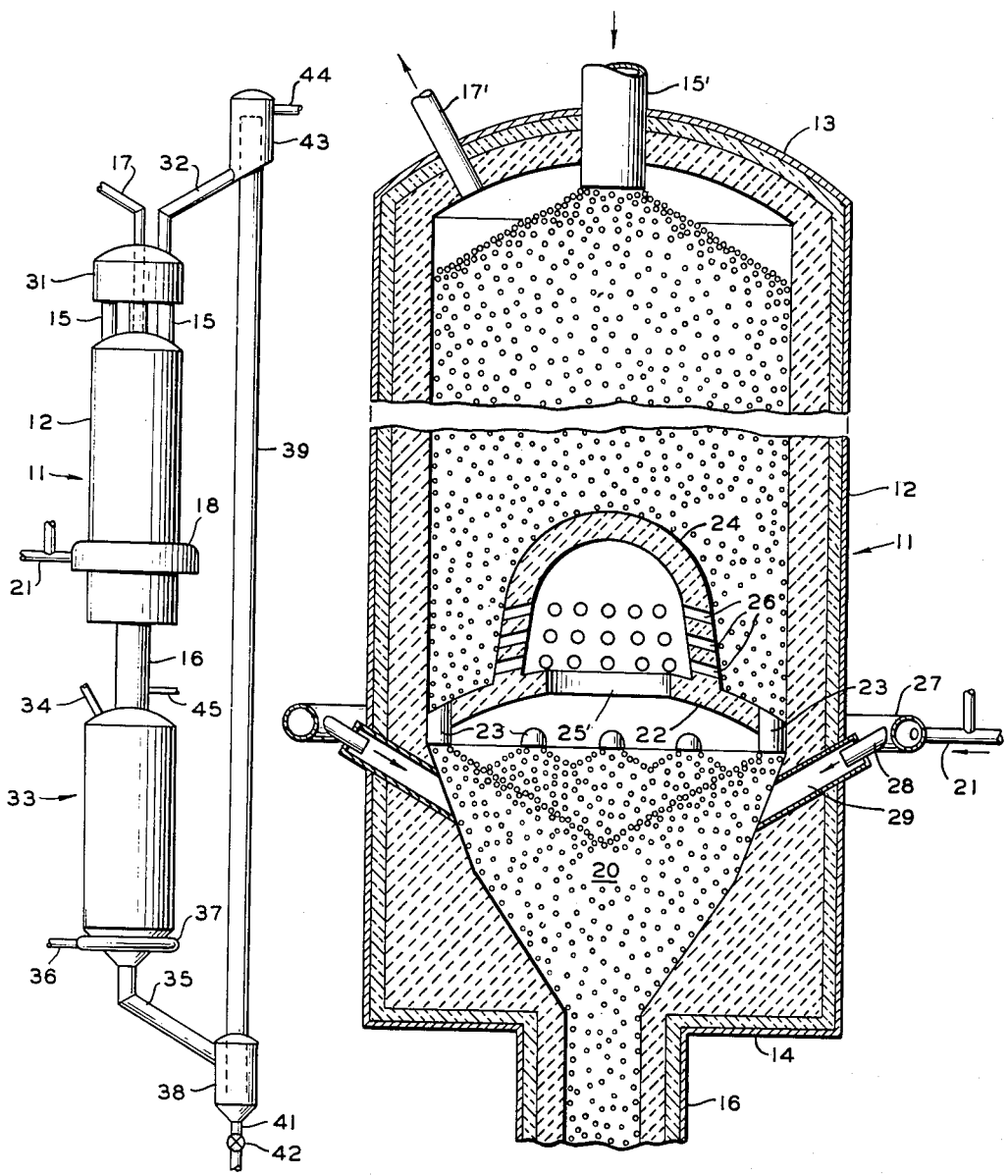
Figure 2 is a vertical section view of a pebble chamber embodying a modification of this invention.
Figure 3 is a schematic view of a pebble heater apparatus.

Referring particularly to the device shown in Figure 2 of the drawings, constituent parts which are the same as those disclosed in connection with Figure 1 of the drawings are identified by like numerals. As discussed, the pebble inlet conduit in this particular chamber is shown as a single conduit 15'. Gaseous effluent conduit 17' extends from the upper end portion of the chamber formed by shell 12 preferably from a point intermediate the peripherial and axial sections thereof. Load supporting dome 22 is modified so as to provide a large central opening 25' therethrough for the passage of gaseous material from soaking zone 20 to the interior of dome 24. Gaseous material inlet conduit 21 is connected to a header member 27 which surrounds at least a portion of the lower end section of shell 12 and communicates with a plurality of burners 28 which in turn are connected with a plurality of combustion tunnels. Combustion tunnels 29 extend into soaking zone 20 formed below load supporting dome at a level below the normal level of pebbles within the soaking zone.

Referring particularly to the device shown in Figure 3 of the drawings, pebble surge chamber 31 is disposed above the uppermost chamber 11 and is provided with pebble inlet conduit means 32 in its upper end portion. When only a single pebble inlet conduit is utilized in connection with chamber 11, pebble inlet conduit 32 is connected with pebble inlet conduit 15' as disclosed in Figure 2 of the drawings. Referring once again to the device shown in Figure 3 of drawings, pebble conduits 15 extend between the lower end portion of pebble surge chamber 31 and the upper end portion of chamber 11. Gaseous effluent conduit 17 extends from the upper end portion of chamber 11 and may extend upwardly through the central portion of pebble surge chamber 31 (as shown) or may extend to the exterior of the chambers intermediate surge chamber 31 and pebble chamber 11. Pebble outlet conduit 16 extends from the lower end portion of chamber 11 to the upper end portion of chamber 33. Gas distribution chamber 18 is connected to the lower end portion of chamber 11 and communicates with the interior of that chamber by means of conduits 19 as shown in connection with Figure 1. Inlet conduit 21 is connected to gas distribution chamber 18 so as to supply combustible materials thereto. As pointed out above, gas distribution chamber 18 can be replaced by header member 27, burners 28, and inlet conduits 29. Gaseous effluent conduit 34 extends from the upper end portion of chamber 33 and pebble outlet conduit 35 extends from the lower end portion of that chamber. Gaseous material inlet conduit 36 and header member 37 are connected to the lower end portion of chamber 33. Pebble feed chamber 38 is connected at its upper end portion to the lower end of pebble outlet conduit 35. Chamber 38 surrounds the lower end portion of gas lift conduit 39. Gas inlet conduit 41, having control valve 42 provided therein, is connected to the lower end of chamber 38, preferably coaxially disposed with respect to the lower end of gas lift conduit 39. Gas-pebble separator chamber 43 surrounds the upper end portion of gas lift conduit 39 and is provided in its upper end portion with gaseous effluent conduit 44. The lower end of chamber 43 is connected to the upper end of pebble conduit 32.

A temperature gradient of as much as 1000° F. may exist across the radius of the pebble bed in a connecting throat between the pebble heating chamber and the reactor chamber. Calculations have been made which have determined that more than 30 minutes are required for a pebble bed in a 7 inch throat to approach uniform temperature when the temperature gradient across the radius of the throat was initially 1000° F. (2200° F. at the wall to 1200° F. at the center). The pebble residence time in a 7 inch throat 6 feet long where the pebble flow rate is 60,000 lbs. per hour is 14.4 seconds. Thus, it is imperative that the pebbles be heated uniformly before leaving the heating chamber since they will not become of a uniform temperature during the short residence time in the throat.

Referring particularly to the operation of the device disclosed in Figures 1, 2 and 3 in the drawings, pebbles are introduced into the upper end portion of chamber 11 either through a single inlet conduit such as conduit 15' or through a plurality of pebble conduits 15 from pebble surge chamber 31. The pebbles form a gravitating contiguous mass within chamber 11. Gaseous heating material is introduced into the lower end portion of chamber 11 and passes upwardly through that chamber in direct heat exchange with gravitating pebbles therein. This gaseous heating material may be preheated to the desired temperature outside of chamber 11. Alternatively, the gaseous heating material may be in the form of fuel and air which is burned either in gas distribution chamber 18 or in a plurality of burners 28. The hot gaseous heating material is introduced into the pebble soaking zone 20 formed below load supporting dome 22. Pebbles gravitating from the pebble heating zone above load supporting dome 22 gravitate through conduits 23 adjacent the periphery of the chamber and form a contiguous gravitating mass of pebbles in the pebble soaking zone 20. The hot gaseous materials which are introduced into the pebble soaking zone are caused to pass through this mass of pebbles before escaping from that zone and flow through opening 25' or openings 25 into the interior of dome 24.

The hot gaseous heating material passes through openings 26 in dome 24 outwardly into the gravitating pebble mass forming an annular bed between dome 24 and the wall of chamber 11. This hot gaseous material passes upwardly through the gravitating pebble bed and escapes from the upper surface of that bed and from the interior of chamber 11 through gaseous effluent conduit 17 or 17' as the case may be. As pointed out above, pebbles heated in the pebble heating section above load supporting dome are raised to non-uniform temperatures for the reasons discussed above. When these pebbles gravitate through conduits 23 into pebble soaking zone 20, those pebbles obtain or give up heat to adjoining pebbles and also obtain heat from hot gases introduced to the pebble soaking zone through conduits 19 or tunnels 29. The residence time for pebbles within this soaking zone is considerably greater than that of pebbles within a given pebble throat of small cross sections. Thus, the transfer of heat between the pebbles and between the pebbles and hot heating gas is quite efficient. In this manner, the pebbles are raised to a uniform temperature before gravitating from the soaking zone through the throat 16 into the reactor chamber 33.

An inert gas such as steam is ordinarily introduced into a connecting throat between the pebble heater and reactor chambers of pebble heater apparatus and this inert gas is also utilized in connection with the instant invention. That gas is introduced into throat 16 through conduit 45. This inert gas prevents reaction products from flowing from chamber 33 through throat 16 into the interior of chamber 11 or prevents the combustion products or heating gas from flowing through throat 16 into the upper end portion of chamber 33.

Gaseous material which is to be contacted with the hot pebbles in chamber 33 is introduced into the lower end portion of that chamber and flows upwardly through the gravitating contiguous pebble mass within that chamber. The gaseous materials are raised to a desired temperature and if those materials are hydrocarbons, such as butane or propane, are raised to conversion temperature in the direct heat exchange with the pebbles. The gaseous effluent is removed from the upper end portion of chamber 33 and cooled pebbles gravitate from that chamber through pebble outlet conduit 35 into chamber 38. Lift gas is introduced into chamber 38 through valve 42 and conduit 41. This lift gas entrains pebbles and lifts those pebbles into elevator conduit 39 and carries them into gas-pebble separator chamber 43 which surrounds the upper end portion of conduit 39. In gas-pebble separator chamber 43 the pebbles and gas are separated, the lift gas being removed from that chamber by means of effluent conduit 44, and the pebbles gravitate through conduit 32 into pebble surge chamber 31 or into pebble conduit 15'.

The pebble throats in the load supporting arch may be adjusted in length so that the depth of the bed in the soaking zone is sized in relation to the amount of heat which must be transferred to remove the temperature gradient across the pebble bed in the throat. The number, size, and outlet level of gas conduits 19 or 29 can also be adjusted so as to obtain this desired result.

One of the advantages which is obtained by means of this invention is that of introducing hot gaseous material into the gravitating pebble mass in a pebble heating section of chamber 11 immediately before those pebbles are gravitated through pebble conduits 23. It is also to be noted that these hot gaseous materials are introduced into a section of pebble bed of rather narrow cross section. These gases are forced upwardly through the gravitating pebble mass and though they may tend to flow toward the central portion of the pebble bed when peripheral pebble inlets are used, taking the path of least resistance therethrough, the pebbles leaving the pebble heating zone have been subjected to the hottest gases immediately before leaving the pebble heating section and are thus raised to a more uniform temperature than would be possible if the heating gases were distributed across a larger area of the bed.

Various modifications of this invention will be apparent to those skilled in the art upon study of the accompanying disclosure. These modifications are believed to be within the spirit or scope of this invention one purpose for which is to provide improved means for introducing gas into a pebble heating chamber and for removing temperature gradients in the pebble throat by means of subjecting the gravitating pebble mass in a soaking zone to contact with hot combustion products.

I claim:

1. An improved pebble heater chamber comprising in combination a closed, upright, elongated shell; pebble inlet means in the upper end of said shell; gaseous effluent outlet conduit means in the upper end portion of said shell; pebble outlet means in the lower end of said shell; a perforate load supporting dome in the lower portion of the chamber formed within said shell, transversely disposed therein and supported at its periphery by said shell; pebble conduits extending through said perforate dome adjacent its periphery, said pebble conduits terminating a substantial distance below the top of said dome to provide a gas collecting space below said dome and the portion of the chamber below said dome being free space to permit the pebble level below said dome to approach the lower ends of said pebble conduits; and heating material inlet conduits extending into the chamber below said dome, spaced a substantial distance downwardly from the outlet ends of said pebble conduits through said dome, and provided at the periphery of said shell.

2. The pebble heater chamber of claim 1 wherein a combustion chamber is provided about the periphery of said shell at its lower end portion and said heating material inlet conduits extend between said combustion chamber and points within the chamber below said dome which are below the normal level of pebbles within that chamber portion.

3. The pebble heater chamber of claim 1 wherein a plurality of burners are provided about the periphery of said shell at its lower end portion and said heating material inlet conduits extend between said burners and points within said chamber below said dome which are below the normal pebble level within that chamber portion.

4. An improved pebble heater chamber comprising in combination a closed, upright, elongated shell; pebble inlet means in the upper end of said shell; gaseous effluent conduit means in the upper end portion of said shell; pebble outlet means in the lower end portion of said shell; a load supporting dome in the lower portion of the chamber formed within said shell, transversely disposed therein and supported at its periphery by said shell; pebble conduits extending through said load supporting dome adjacent its periphery, said pebble conduits terminating a substantial distance below the top of said dome to provide a gas collecting space below said dome and the portion of the chamber below said dome being free space to permit the pebble level below said dome to approach the lower ends of said pebble conduits; a secondary dome smaller in diameter than the chamber formed by said shell, coaxially disposed with respect to said chamber and supported on said load supporting dome, forming an annular chamber between said shell and said secondary dome, said load supporting dome being perforate for gas passage only through the section within the periphery of said secondary dome and said secondary dome being perforate for gas flow through its side wall; and heating material inlet conduits extending into the chamber below said load supporting dome, spaced a substantial distance downwardly from the outlets of said pebble conduits through said dome, and provided at the periphery of said shell.

5. The pebble heater chamber of claim 4 wherein a combustion chamber is provided about the periphery of said shell at its lower end portion and said heating material inlet conduits extend between said combustion chamber and points within the chamber below said dome which are below the normal level of pebbles within that chamber portion.

6. The pebble heater chamber of claim 4 wherein a plurality of burners are provided about the periphery of said shell at its lower end portion and said heating material inlet conduits extend between said burners and points within said chamber below said dome which are below the normal pebble level within that chamber portion.

References Cited in the file of this patent

UNITED STATES PATENTS

| | | |
|---|---|---|
| 2,536,436 | Goins | Jan. 2, 1951 |
| 2,538,472 | Robinson | Jan. 16, 1951 |
| 2,563,322 | Ebbets et al. | Aug. 7, 1951 |
| 2,571,749 | Norton | Oct. 16, 1951 |
| 2,620,175 | Weber | Dec. 2, 1952 |
| 2,623,842 | Robinson | Dec. 30, 1952 |
| 2,635,864 | Goins | Apr. 21, 1953 |
| 2,635,990 | Goins | Apr. 21, 1953 |
| 2,673,791 | McIntire | Mar. 30, 1954 |
| 2,678,812 | Richardson | May 18, 1954 |